N. J. TRENERY & J. L. SISLEY.
Sulky-Cultivator.
No. 218,840.       Patented Aug. 26, 1879.
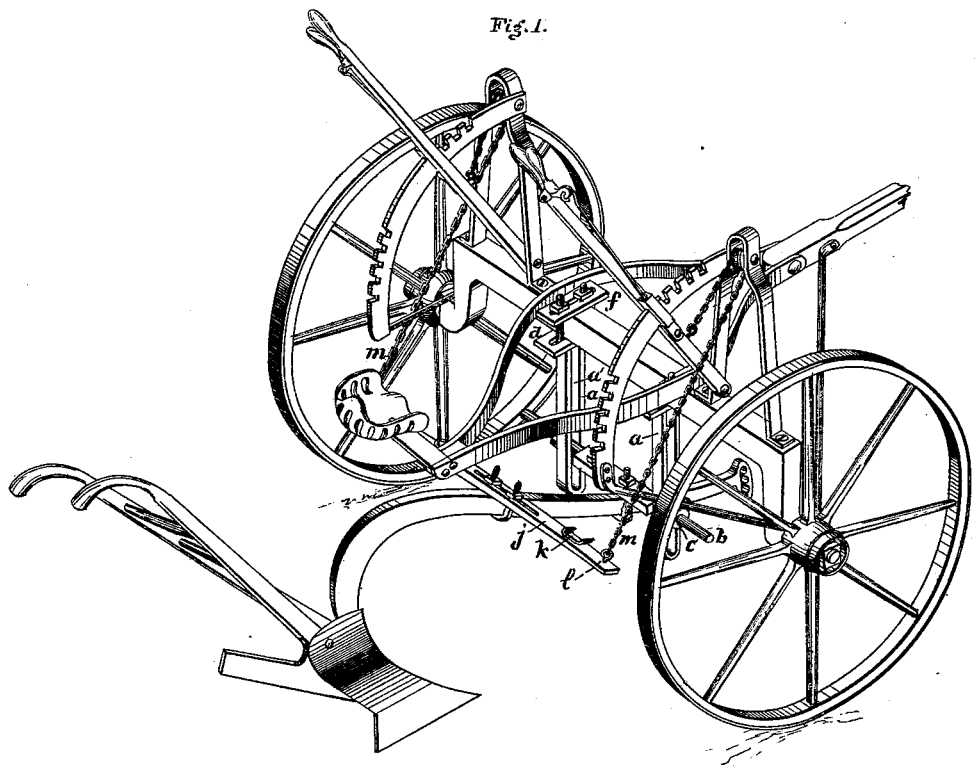
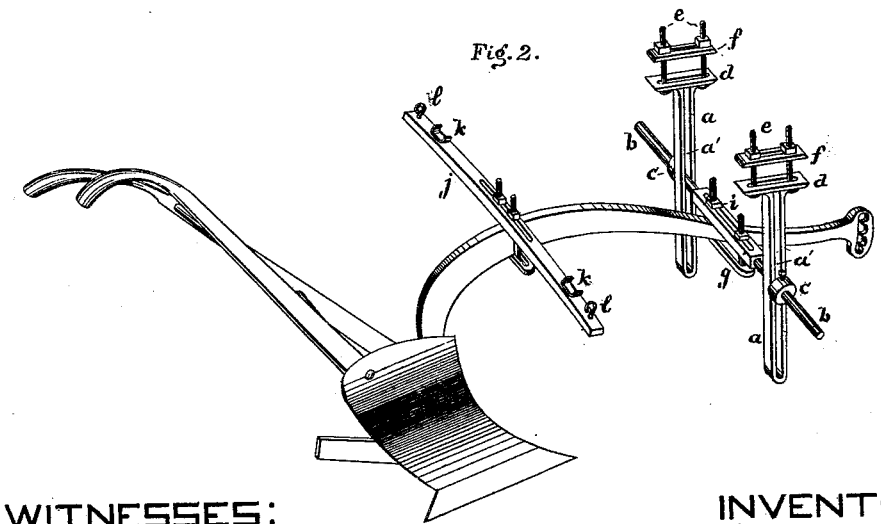
WITNESSES:
INVENTORS:
Nelson J. Trenery
and John L. Sisley
By Paine & Grafton
Attorneys.

UNITED STATES PATENT OFFICE.

NELSON J. TRENERY AND JOHN L. SISLEY, OF MIFFLIN, WISCONSIN.

IMPROVEMENT IN SULKY-CULTIVATORS.

Specification forming part of Letters Patent No. 218,840, dated August 26, 1879; application filed October 2, 1878.

*To all whom it may concern:*

Be it known that we, NELSON J. TRENERY and JOHN L. SISLEY, of Mifflin, in the county of Iowa and State of Wisconsin, have invented certain new and useful Improvements in the Attachments of Plows to Sulky-Cultivators; and we do hereby declare that the following is a full, clear, and exact description of the invention, which will enable others skilled in the art to which it appertains to make and use the same, reference being had to the accompanying drawings, and to letters of reference marked thereon, which form a part of this specification.

Our invention relates to devices for the attachment of plows to sulky-cultivators; and the object sought to be accomplished is to combine the two implements, the common stubble, breaking, or other plow and the common sulky-cultivator, and make one set of wheels and one riding attachment available for both purposes.

The invention consists of the improved devices for accomplishing this result herein described, which will be fully understood from the following description and claim.

Figure 1 shows a common iron-beam stubble-plow attached to a sulky-cultivator of ordinary construction, and Fig. 2 the plow and attachments without the sulky-cultivator.

The two vertical uprights $a$ are attached to the axle of the sulky-cultivator, the shovels having been removed, by means of the bolts $e$ and plates $d$ and $f'$. The bolts $e$ have square heads fitting in the slots of the plates $d$, and they pass up, one on each side of the axle of the sulky, through the slotted plate $f$, placed on the top of the axle, and are firmly clamped.

A simple iron stirrup passing around the axle and bolted to the uprights may be used, or any other adjustable attachment that will adapt itself to the size of the axle. The uprights $a$ have the vertical slots $a'$ and the rod $b$, to which the plow is attached, plays freely in these slots, and permits the plow to run smoothly without disturbance from the inequalities over which the wheels may pass.

The cross-bar $b$ has adjustable washers $c$ to gage the position of the plow. These washers may go on either side of the uprights $a$, or they may be made to span the uprights and fasten on either side by means of a clamp-screw, in order to make the parts more rigid.

The cross-bar $b$ is clamped to the plow-beam by means of the clevis $g$ and nuts $i$. The clevis is made large enough to embrace any plow-beam, and its bolts pass through a slot or holes in the center of the cross-bar $b$.

Behind the cross-bar $b$ there is a second cross-bar, $j$, which is clamped to the plow-beam by a clevis and nuts similar to the attachment of the cross-bar $b$ to the plow-beam, or in any other well-known and adjustable manner. This cross-bar has the stirrups $k$ placed at a suitable distance apart, on which the feet of the driver rest, and at the ends of the bar are staples or hooks $l$, to which the chains $m$, used to lift the shovels of the cultivator, are attached.

The operation of the devices is as follows: The team is attached directly to the plow, and the driver sits with his feet on the stirrups $k$. It will be seen that the plow can be placed in any position with respect to the wheels of the sulky, either in the center or to one side, and the cross-bar $b$, moving freely in the vertical slots of the uprights, permits the plow to travel independent of the uncertain movements of the wheels in passing over inequalities of the ground, and the depth of the furrow is regulated quite independent of the wheels or riding attachment. The driver guides the plow with his feet, and can keep it true and even by resting as much of his weight upon it, either equally or on one side or the other, as may be necessary. The plow is raised by means of the chains $m$ and handles used to lift the shovels of the cultivator.

Having thus described our invention, what we claim as new, and desire to secure by Letters Patent, is—

The combination of the uprights $a$ and cross-bars $b$ and $j$ with a plow and sulky-cultivator, means being provided for the adjustable attachment of the parts to the axle and lifting-chains of the cultivator and to the beam of the plow, all substantially as described, and for the purpose set forth.

In testimony that we claim the foregoing as our own we affix our signatures in presence of two witnesses.

NELSON J. TRENERY.
JOHN L. SISLEY.

Witnesses:
THOS. WATSON,
W. E. CARTER.